(12) United States Patent
Mishra et al.

(10) Patent No.: US 10,091,530 B2
(45) Date of Patent: Oct. 2, 2018

(54) PIPELINED INTRA-PREDICTION HARDWARE ARCHITECTURE FOR VIDEO CODING

(71) Applicant: QUALCOMM Incorporated, San Diego, CA (US)

(72) Inventors: Ashish Mishra, Bangalore (IN); Arindam Mohanta, Bangalore (IN)

(73) Assignee: QUALCOMM Incorporated, San Diego, CA (US)

(*) Notice: Subject to any disclaimer, the term of this patent is extended or adjusted under 35 U.S.C. 154(b) by 549 days.

(21) Appl. No.: 14/503,669

(22) Filed: Oct. 1, 2014

(65) Prior Publication Data

US 2016/0100191 A1 Apr. 7, 2016

(51) Int. Cl.
| | |
|---|---|
| *H04N 19/61* | (2014.01) |
| *H04N 19/119* | (2014.01) |
| *H04N 19/146* | (2014.01) |
| *H04N 19/176* | (2014.01) |
| *H04N 19/52* | (2014.01) |
| *H04N 19/593* | (2014.01) |
| *H04N 19/182* | (2014.01) |

(Continued)

(52) U.S. Cl.
CPC .......... *H04N 19/61* (2014.11); *H04N 19/119* (2014.11); *H04N 19/146* (2014.11); *H04N 19/176* (2014.11); *H04N 19/182* (2014.11); *H04N 19/436* (2014.11); *H04N 19/52* (2014.11); *H04N 19/593* (2014.11); *H04N 19/82* (2014.11)

(58) Field of Classification Search
CPC .... H04N 19/61; H04N 19/146; H04N 19/119; H04N 19/52; H04N 19/593

USPC .......... 375/240.12, 240.24, 240.25
See application file for complete search history.

(56) References Cited

U.S. PATENT DOCUMENTS 6,963,341 B1 * 11/2005 Mimar ............... G06F 15/8084
345/505
8,601,178 B2   12/2013 Amini et al.
(Continued)

FOREIGN PATENT DOCUMENTS

WO    WO-2012167419 A2    12/2012

OTHER PUBLICATIONS

He G., et al., "Intra Prediction Architecture for H.264/AVC QFHD Encoder", Picture Coding Symposium 2010; Aug. 12, 2010-Oct. 12, 2010; Nagoya, Dec. 8, 2010 (Dec. 8, 2010), XP030082026, pp. 450-453.
(Continued)

*Primary Examiner* — On S Mung
(74) *Attorney, Agent, or Firm* — Knobbe, Martens, Olson & Bear, LLP

(57) ABSTRACT

As the quality and quantity of shared video content increases, video encoding standards and techniques are being developed and improved to reduce bandwidth consumption over telecommunication and other networks. One technique to reduce bandwidth consumption is intra-prediction, which exploits spatial redundancies within video frames. Each video frame may be segmented into blocks, and intra-prediction may be applied to the blocks. However, intra-prediction of some blocks may rely upon the completion (e.g., reconstruction) of other blocks, which can make parallel processing challenging. Provided are exemplary techniques for improving the efficiency and throughput associated with the intra-prediction of multiple blocks.

26 Claims, 8 Drawing Sheets

(51) Int. Cl.
*H04N 19/82* (2014.01)
*H04N 19/436* (2014.01)

(56) References Cited

U.S. PATENT DOCUMENTS

| | | |
|---|---|---|
| 2013/0101029 A1 | 4/2013 | Srinivasan et al. |
| 2013/0343665 A1 | 12/2013 | Maeda |
| 2014/0003525 A1 | 1/2014 | Fuldseth |
| 2014/0092980 A1 | 4/2014 | Guo et al. |

OTHER PUBLICATIONS

International Search Report and Written Opinion—PCT/US2015/045876—ISA/EPO—dated Oct. 29, 2015.

Kumar S., et al., "Enabling Sub-LCU level parallel decoding", 8. JCT-VC Meeting; 99. MPEG Meeting; Jan. 2, 2012-Oct. 2, 2012; San Jose; (Joint Collaborative Team on Video Coding of ISO/ IEC JTC1/SC29/WG11 and ITU-T SG.16); URL: http: //wftp3.itu.int/av-arch/jctvc-site/,, No. JCTVC-H0549, Jan. 21, 2012 (Jan. 21, 2012), XP030111576, 6 pages.

Rapaka K., et al., "On parallel processing capability of intra block copy", 19. JCT-VC Meeting; Oct. 17, 2014-Oct. 24, 2014; Strasbourg; (Joint Collaborative Team on Video Coding of ISO/IEC JTC1/SC29/WG11 and ITU-T SG.16); URL: http://wftp3.itu.int/av-arch/jctvc-site/,, No. JCTVC-S0220-v2, Oct. 18, 2014 (Oct. 18, 2014), XP030117009, 8 pages.

Segall A., et al., "Parallel intra prediction for video coding", 2010 Picture Coding Symposium (PCS 2010), Nagoya, Japan, Dec. 8-10, 2010, IEEE, Piscataway, NJ, Dec. 8, 2010 (Dec. 8, 2010), pp. 310-313, XP031885165, DOI: 10.1109/PCS.2010.5702495, ISBN: 978-1-4244-7134-8.

Zhao J., et al., "CE6.d Parallel Intra Coding", 6. JCT-VC Meeting; 97. MPEG Meeting; Jul. 14, 2011-Jul. 22, 2011; Torino; (Joint Collaborative Team on Video Coding of ISO/IEC JTC1/SC29/WG11 and ITU-T SG.16); URL: http://wftp3. itu.int/av-arch/jctvc-site/, No. JCTVC-F605, Jul. 2, 2011 (Jul. 2, 2011), XP030009628, 5 pages.

Bross, B., et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27, 2012-May 7, 2012, JCTVC-I1003_d2, XP030112373, (May 10, 2012), pp. 1-290.

Bross, B., et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE, Jul. 11-20, 2012, JCTVC-J1003_d7, pp. 261.

ITU-T H.265, Series H: Audiovisual and Multimedia Systems, Infrastructure of audiovisual services—Coding of moving video, High efficiency video coding, The International Telecommunication Union, Apr. 2013, 317 pp.

Verma A., "The Next Frontier in Video Encoding," Texas Instruments, Sep. 2013, 7 Pages.

* cited by examiner

PIPELINED INTRA-PREDICTION HARDWARE ARCHITECTURE FOR VIDEO CODING

BACKGROUND

1. Technical Field

The present application generally relates to intra-prediction in video encoders and video decoders and, more specifically, to hardware implementations of intra-prediction using pipelining techniques.

2. Related Art

Video codecs, such as those used in High Efficiency Video Coding (HEVC), incorporate a variety of techniques to compress video for use in mobile devices, smart TVs, and many other video applications. One such technique is intra-prediction, which takes advantage of spatial redundancies within a video frame to reduce the file size and/or bandwidth required for video streaming.

A video frame is generally segmented into blocks of pixels, and a given block is often highly correlated with the blocks and pixels immediately around it. Accordingly, the pixels within a block can be interpolated from neighbor pixels that have already been calculated. The nature of the dependency may be stored as an intra-prediction mode. Once the intra-prediction mode is determined, only the differences (e.g., residuals) between the interpolated pixels and the actual pixels need to be encoded. These residuals are encoded in subsequent processing stages, which include a discrete cosine transformation (DCT), quantization, and entropy coding. By taking spatial redundancy into account, intra-prediction can greatly increase the overall compression ratio.

In HEVC, some reference frames (e.g., intra-coded pictures or I-frames) are encoded and decoded entirely by intra-prediction (as opposed to inter-prediction). Reference frames may comprise a plurality of coding units (CU), and each CU may be divided into transform units (TU) of size M×M. The CU may be further divided into coding blocks (CB) which may be associated with chroma or luma information. Similarly, the TUs may be divided into transform blocks (TB). Intra-prediction modes may be computationally applied at a TB level.

The HEVC standard dictates that 4M+1 neighbor pixels may be used to perform the intra-prediction, and these neighbor pixels must therefore be padded, filtered, and potentially conditioned in other ways before intra-prediction for a given block (e.g., TU) begins. After the intra-prediction of the block is completed, the intra-prediction of the next block begins. The two blocks may be processed sequentially, because intra-prediction of the second block may generally depend upon reconstructed pixels derived from the intra-prediction of the first block and/or of other previously calculated blocks. Thus, the HEVC standard inherently requires a degree of sequential processing of each block at this stage, which is true for many other video standards as well.

SUMMARY

Given the requirement of sequential processing described above, the present disclosure aims to reduce latency between intra-prediction of consecutive blocks (e.g., consecutive transform units within a coding unit). It is noted that the intra-prediction of the second block often does not depend on every reconstructed pixel associated with the first block, but merely on a single critical row or column, depending on the relative position of the first and second blocks. If each block is intra-predicted using a raster scan, as is typically done, the critical row or column is intra-predicted only towards the very end of the processing cycle of the first block. As reconstruction, filtering, padding, and/or other conditioning of the pixels of the critical row or column can take many processing cycles, the intra-prediction of the second block is delayed. In HEVC, each coding unit can contain up to 256 transform units, and so these delays can add up quickly to reduce overall performance.

The proposed hardware architecture may utilize an intra-prediction processing unit operable to prioritize the pixel generation for the critical rows and columns in a first block. A neighbor processing unit may receive reconstructed pixels corresponding to the critical rows and columns and may further prepare (e.g., pad and filter) the neighbor pixels for the intra-prediction of the second block before intra-prediction of the first block is completed. This allows the intra-prediction processing unit to quickly transition between each of the blocks. By interleaving neighbor processing and intra-prediction, latency between intra-prediction of consecutive blocks (e.g., adjacent transform units that are within a coding unit) is removed or reduced.

Furthermore, the plurality of intra-prediction engines may operate in parallel to process a given block. The number (N) of intra-prediction engines may scale with the read bandwidth (e.g., 2N pixels per cycle) of a neighbor buffer (e.g., comprising neighbor RAM) used to store neighbor pixels. In general, the maximum read rate of memory used by the intra-prediction engines may be closely matched to the rate at which the intra-prediction engines output pixels for reconstruction (and, e.g., for intra-prediction of subsequent blocks). The disclosed systems and methods may accordingly scale to manage the common bottleneck associated with read bandwidth.

BRIEF DESCRIPTION OF THE DRAWINGS

Features, aspects, and embodiments of the disclosure are described in conjunction with the attached drawings, in which.

These exemplary figures and embodiments are to provide a written, detailed description of the subject matter set forth by any claims that issue from the present application. These exemplary figures and embodiments should not be used to limit the scope of any such claims.

Further, although similar reference numbers may be used to refer to similar structures for convenience, each of the various example embodiments may be considered to be distinct variations.

DETAILED DESCRIPTION

Figure 1:
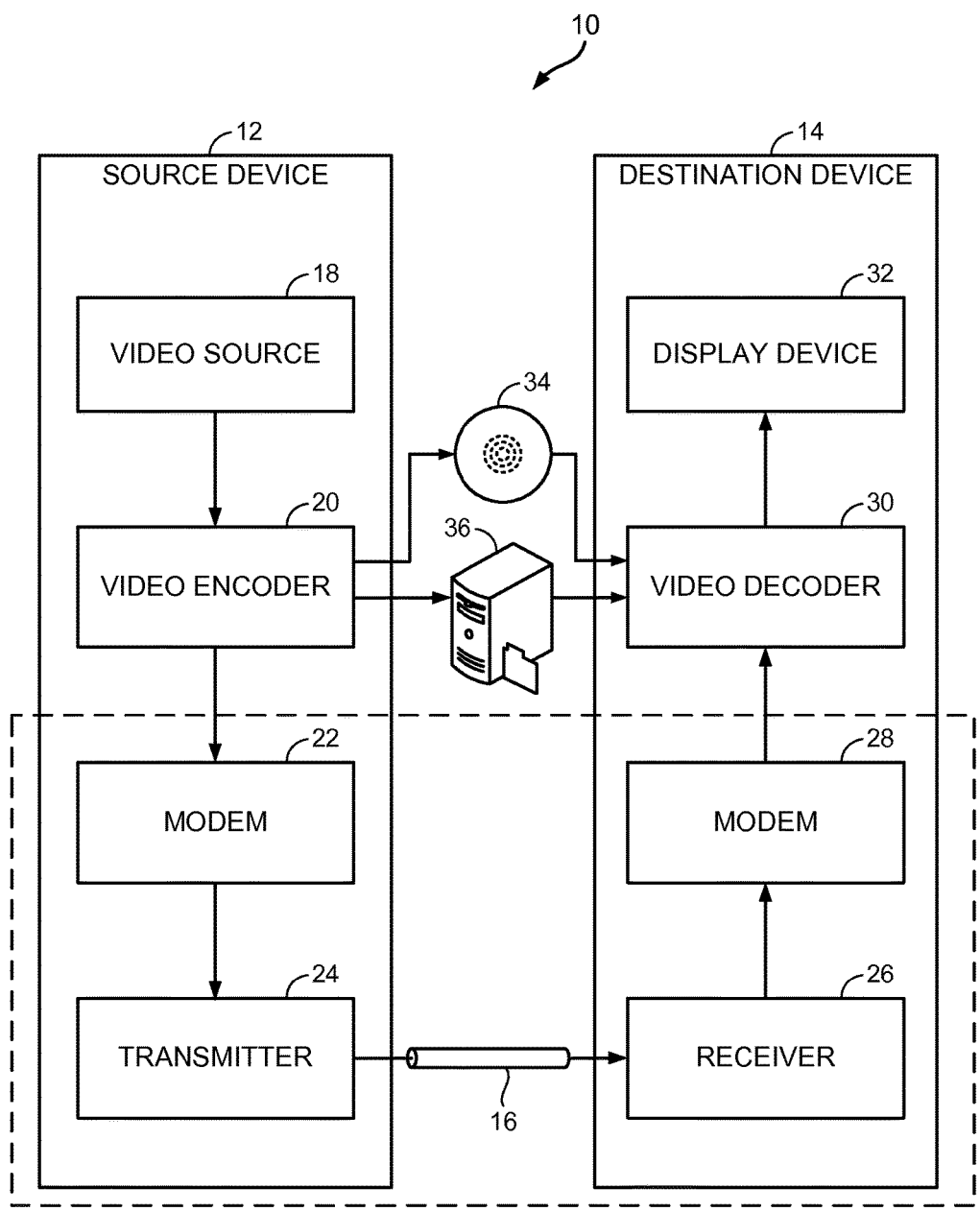
FIG. 1 shows a block diagram illustrating an example of a video encoding and decoding system that may be configured to utilize techniques for pipelined intra-prediction in accordance with the principles of the present disclosure.

FIG. 1 shows a block diagram illustrating an example of a video encoding and decoding system 10 that may be configured to utilize techniques for pipelined intra-prediction in accordance with the principles of the present disclosure. As shown in FIG. 1, the system 10 includes a source device 12 that transmits encoded video to a destination device 14 via a communication channel 16. Encoded video may also be stored on a storage medium 34 or a file server 36 and may be accessed by the destination device 14 as desired. The source device 12 and the destination device 14 may comprise any of a wide variety of devices including desktop computers, notebook (e.g., laptop) computers, tablet computers, set-top boxes, telephone handsets (e.g., smartphones or other personal communication devices), televisions, cameras, display devices, digital media players, video gaming consoles, mobile devices, and the like. In many cases, such devices may be equipped for wireless communication, wired communication, or both. Accordingly, the communication channel 16 may comprise a wireless channel (e.g., a Wi-Fi connection), a wired channel (e.g., DSL, cable modem, Ethernet, USB), or a combination of wireless and wired channels suitable for transmission of encoded video data.

The principles of the present disclosure may be applied to video coding in support of any of a variety of multimedia applications, such as over-the-air television broadcasts, cable television transmissions, satellite television transmissions, streaming video transmissions (e.g., via the internet), encoding of digital video for storage on a data storage medium, decoding of digital video stored on a data storage medium, and other applications.

In some embodiments, the devices 12, 14 may operate in a substantially symmetrical manner, such that each of the devices 12, 14 includes video encoding and decoding components. Accordingly, the system 10 may be configured to support both one-way and two-way video transmission to support applications such as video streaming, video playback, video broadcasting, and video telephony.

In the embodiment shown in FIG. 1, the source device 12 includes a video source 18, a video encoder 20, a modulator/demodulator (modem) 22, and a transmitter 24. The video source 18 may comprise any combination or individual instances of a video capture device (e.g., video camera), a video archive containing previously captured video, a video feed interface operable to receive video from a video content provider, and a computer graphics system for generating computer graphics data as the source video. In some embodiments, the video source 18 may be a video camera, and the source device 12 and the destination device 14 may form camera phones or video phones. However, the techniques described in this disclosure are applicable to video coding in general, and may be applied to wireless and/or wired applications.

The captured, pre-captured, or computer-generated video may be encoded by the video encoder 20. The encoded video information may be modulated by the modem 22 according to a communication standard, such as a wireless communication protocol, and transmitted to the destination device 14 via the transmitter 24. The modem 22 may include various mixers, filters, amplifiers, and other components designed for signal modulation. The transmitter 24 may include circuits designed for transmitting data, including amplifiers, filters, and one or more antennas.

The captured, pre-captured, or computer-generated video that is encoded by the video encoder 20 may also be stored onto a storage medium 34 or a file server 36 for later consumption. The storage medium 34 may include Blu-ray discs, DVDs, CD-ROMs, flash memory, or any other suitable digital storage media for storing encoded video. The encoded video stored on the storage medium 34 may then be accessed by the destination device 14 for decoding and playback.

The file server 36 may be any type of server capable of storing encoded video and transmitting that encoded video to the destination device 14. Example file servers include a web server (e.g., for a website), an FTP server, a network attached storage (NAS) device, a local disk drive, or any other type of device capable of storing encoded video data and transmitting it to a destination device. The transmission of encoded video data from the file server 36 may be a streaming transmission, a download transmission, or a combination of both. The file server 36 may be accessed by the destination device 14 through any standard data connection, including an internet connection. This may include a wireless channel (e.g., a Wi-Fi connection), a wired connection (e.g., DSL, cable modem, Ethernet, USB), or a combination of both that is suitable for accessing encoded video data stored on a file server.

In the example of FIG. 1, the destination device 14 includes a receiver 26, a modem 28, a video decoder 30, and a display device 32. The receiver 26 receives information over the channel 16, and the modem 28 demodulates the information to produce a demodulated bitstream for the video decoder 30. The information communicated over the channel 16 may include a variety of syntax information generated by the video encoder 20 for use by the video decoder 30 in decoding video data. Such syntax may also be included with the encoded video data stored on the storage medium 34 or the file server 36. Each of the video encoder 20 and the video decoder 30 may form part of a respective encoder-decoder (CODEC) that is capable of encoding and decoding video data.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In the embodiment shown in FIG. 1, the communication channel 16 may comprise any wireless or wired communication medium, such as a radio frequency (RF) spectrum or one or more physical transmission lines, or any combination of wireless and wired media. The communication channel 16 may form part of a packet-based network, such as a local area network, a wide area network, or a global network (e.g., the internet). The communication channel 16 generally represents any suitable communication medium, or collection of different communication media, for transmitting video data from the source device 12 to the destination device 14 or bi-directionally between the source device 12 and the destination device 14. The communication channel 16 may include routers, switches, base stations, or any other equipment that may be useful to facilitate communication between the source device 12 and the destination device 14.

The High Efficiency Video Coding (HEVC) standard is being developed by the Joint Collaboration Team on Video Coding (JCT-VC) of ITU-T Video Coding Experts Group (VCEG) and ISO/IEC Motion Picture Experts Group (MPEG). A recent draft of the HEVC standard, referred to as "HEVC Working Draft 7" is downloadable from http://phenix.it-sudparis.eu/jct/doc_end_user/documents/9_Geneva/wg11/JICTVC-I1003-v3, as of Jun. 7, 2012. The full citation for the HEVC Working Draft 7 is document JCTVC-I1003, Bross et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11, 9th Meeting: Geneva, Switzerland, Apr. 27, 2012 to May 7, 2012. An additional recent draft of the HEVC standard, referred to as "HEVC Working Draft (WD) 8," is available from http://phenix.int-evry.fr/jct/doc_end_user/documents/10_Stockholm/wg11/JCTVC-J1003-v8.zip. The approved HEVC specification can be found at http://www.itu.int/rec/T-REC-H.265-201304-I, as of April 2013. Each of the references set forth in the present paragraph is incorporated by reference in its entirety herein.

The HEVC standard describes that a video frame or picture may be divided into a sequence of largest coding units (LCU), which may also be referred to as coding tree units (CTU). Each CTU may comprise a plurality of coding tree blocks (e.g., one luma CTB and two chroma CTBs). Each CTU may also be split into coding units (CUs) according to a quadtree. In general, a quadtree data structure includes one node per CU, with a root node corresponding to the CTU. For example, a CTU's quadtree may be split into four child nodes (which may be associated with sub-CUs), and one or more of these child nodes may additionally be a parent node that is split into another four child nodes. Each final, unsplit child node of the quadtree, also referred to as a leaf node, may correspond with a leaf-CU. In general, a CU has a similar purpose as a macroblock of some non-HEVC standards (e.g., the H.264 standard), with a few differences (e.g., CUs may vary in size). Accordingly, the terms "CU" and "macroblock" may be used interchangeably in this document, without any loss of generality.

Each CU may comprise a coding node as well as one or more prediction units (PUs) and one or more transform units (TUs) associated with the coding node. The CU size may correspond to the size of the coding node and may generally be square in shape. For example, the CU size may range from 8×8 pixels up to the size of the CTU, which may have a maximum size (e.g., 64×64 pixels).

In this disclosure, "M×M" and "M by M" may be used interchangeably to refer to the pixel dimensions of a video block in terms of horizontal and vertical dimensions, respectively (e.g., 16×16 pixels or 16 by 16 pixels). In general, a 16×16 block will have 16 pixels in a horizontal direction (x=16) and 16 pixels in a vertical direction (y=16). Likewise, an M×M block generally has M pixels in a horizontal direction and M pixels in a vertical direction, where M represents a nonnegative integer value. The pixels in a block may be arranged in rows and columns Common sizes for blocks (e.g., TUs in HEVC) may include 4×4, 8×8, 16×16, and 32×32. However, blocks need not necessarily have the same number of pixels in the horizontal direction as in the vertical direction. For example, blocks may comprise M×P pixels, where P is not necessarily equal to M.

Syntax data associated with a leaf-CU may describe a partitioning of the leaf-CU into one or more TUs. In some examples, residual samples corresponding to a leaf-CU may be subdivided into TUs using a quadtree structure known as "residual quad tree" (RQT), where the leaf nodes of the RQT are associated with TUs. That is, a leaf-CU may include a quadtree indicating how the leaf-CU is partitioned into TUs. An RQT (e.g., a TU quadtree) may have a root node that generally corresponds to a leaf-CU, while the root node of a CU quadtree may generally correspond to an LCU. Accordingly, one or more TU quadtrees may be nested within a CU quadtree.

The child nodes of an RQT that are not split may be associated with leaf-TUs. In general, this disclosure uses the terms CU and TU to refer to leaf-CU and leaf-TU, respectively, unless noted otherwise.

The HEVC standard allows for transformations on a TU-by-TU basis, where the TU size may vary between CUs. A TU may be square or non-square (e.g., rectangular) in shape. Further, the TUs are typically the same size or smaller than the PUs within a given CU during intra-prediction, though TUs may be larger than the corresponding PUs of an inter-predicted CU. Pixel difference values associated with the TUs may be transformed to produce transform coefficients, which may be quantized.

Syntax data associated with a CU may also describe a partitioning of the CU into one or more PUs, where PUs include data related to prediction. In general, a PU represents a spatial area corresponding to all or a portion of the corresponding CU, and may include data for retrieving a reference sample for the PU. Available PU partitioning modes may vary depending on whether the CU is skip or direct mode encoded, intra-prediction mode encoded, or inter-prediction mode encoded. For example, when a CU is intra-prediction mode encoded, it may correspond with a single PU having the same size as the CU or four square PUs that are each a fourth of the size of the CU. Further, data for the PU (e.g., an intra-prediction mode indicator) may be included in the RQT, such that it may apply to one or more TUs corresponding to the PU. In some scenarios, a PU may be non-square (e.g., rectangular) in shape.

Generally, for intra-coding (e.g., intra-predictive coding), all the TUs belonging to a CU share the same intra-prediction mode. That is, a CU is may be the same size as the PU for intra-predictive coding, thereby having a common intra-prediction mode to calculate predicted values for all TUs of the CU. In some scenarios, an intra-coded CU may be divided into four PUs, and the CU may also be divided into at least four TUs. Accordingly, during intra-prediction, TUs are smaller than or equal in size to the corresponding PU. For intra-coding, a video encoder may calculate a residual value for each TU using the intra-prediction mode, as a difference between the portion of the CU corresponding to the TU and the original block.

During inter-prediction, a TU may be larger, smaller, or equal in size to a PU within a common CU. Thus, a TU may correspond to a plurality of PUs, where the TU is larger than each of the corresponding PUs. Alternatively, a PU may correspond to a plurality of TUs, where the PU is larger than each of the corresponding TUs. However, neither a PU nor a TU may be larger than a corresponding CU.

The video encoder 20 and the video decoder 30 may operate according to a video compression standard, such as the HEVC standard or extensions to the HEVC standard. Alternatively or additionally, the video encoder 20 and the video decoder 30 may operate according to other proprietary or industry standards, such as the International Telecommunication Union Telecommunication Standardization Sector (ITU-T) H.264 standard, alternatively referred to as MPEG-4, Part 10, Advanced Video Coding (AVC), or extensions of such standards. Other examples may include VP9, MPEG-2, and ITU-T H.263. The techniques of this disclosure, however, are not limited to any particular coding standard or technique.

Although not shown in FIG. 1, in some aspects, the video encoder 20 and the video decoder 30 may each be integrated with an audio encoder and decoder, and may include appropriate multiplexing and demultiplexing modules, or other hardware and/or software, to handle the encoding of both audio and video in a common data stream or separate data streams. If applicable, in some embodiments, the multiplexing and demultiplexing modules may conform to the ITU H.223 multiplexer protocol, or other protocols such as the user datagram protocol (UDP).

A video coder, as described in this disclosure, may refer to a video encoder, a video decoder, or both. The video encoder 20 and the video decoder 30 may each be implemented as any of a variety of suitable coder circuitry, such as one or more microprocessors, digital signal processors (DSPs), application specific integrated circuits (ASICs), field programmable gate arrays (FPGAs), discrete logic, software, hardware, firmware, or any combinations thereof. When the techniques are implemented at least partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder (CODEC) in a respective device.

One or both of the video encoder 20 and the video decoder 30 may implement any or all of the techniques described in this disclosure to improve the intra-prediction process.

Figure 2:
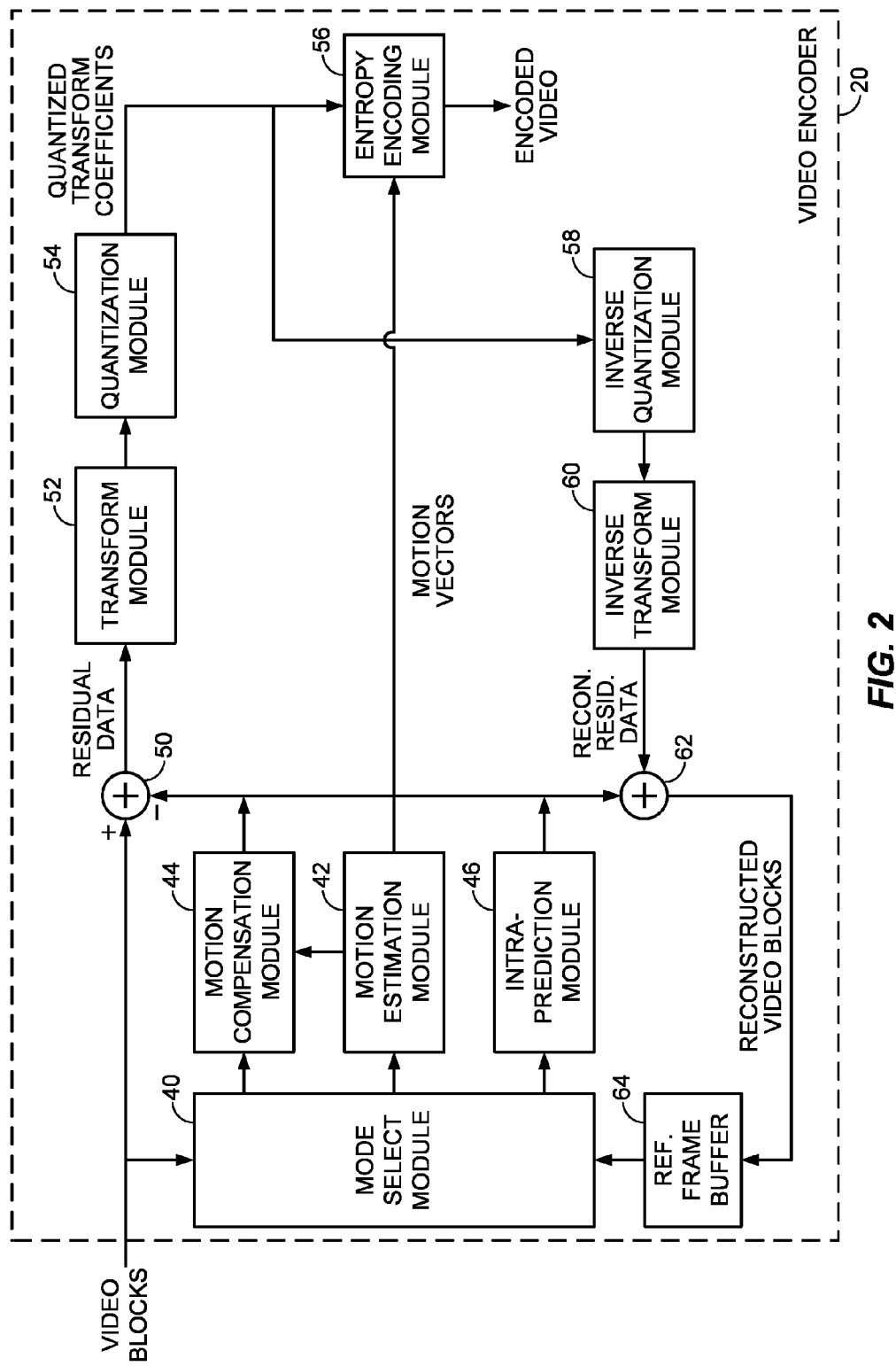
FIG. 2 shows a block diagram illustrating an example of a video encoder that may be implemented in accordance with the disclosed principles.

FIG. 2 shows a block diagram illustrating an example of a video encoder 20 that may be implemented in accordance with the disclosed principles. The video encoder 20 may be configured to perform any or all of the disclosed techniques for improved intra-prediction. The video encoder 20 will be described in the context of HEVC for purposes of illustration, but without limitation of this disclosure as to other coding standards or methods that may benefit from an improved intra-prediction process.

The video encoder 20 may perform intra- and inter-coding of coding units (CUs) within video frames. Intra-coding relies on spatial prediction to reduce or remove spatial redundancy in video within a given video frame. Inter-coding relies on temporal prediction to reduce or remove temporal redundancy between a current frame and previously coded frames of a video sequence. The previously coded frames may be before and/or after the current frame in a video sequence (e.g., within a group of pictures (GOP)). Intra-mode (I-mode) may refer to any of several spatial-based video compression modes. Inter-modes such as uni-directional prediction mode (P-mode) or bi-directional prediction mode (B-mode) may refer to any of several temporal-based video compression modes.

As shown in FIG. 2, the video encoder 20 receives a current video block within a video frame to be encoded. In the example of FIG. 2, the video encoder 20 includes a motion compensation module 44, a motion estimation module 42, an intra-prediction module 46, a reference frame buffer 64, a summer 50, a transform module 52, a quantization module 54, and an entropy encoding module 56. The transform module 52 applies a transform (e.g., discrete cosine transform (DCT)) to a block of residual data containing one or more transform units (TU), where each TU may comprise a plurality of transform blocks (e.g., one luma TB and two chroma TB). For video block reconstruction, the video encoder 20 also includes an inverse quantization module 58, an inverse transform module 60, and a summer 62. A deblocking filter (not shown) may also be included to filter block boundaries to remove blockiness artifacts from reconstructed video. If desired, the deblocking filter would typically filter the output of the summer 62. Additional filters (in-loop or post-loop) may also be used in addition to the deblocking filter. While the additional filters are not shown for brevity, they may be included at various locations within the video encoder 20, such as at the output of the summer 50 for in-loop filtering.

Although shown as separate functional modules for ease of illustration, the structure and functionality of any of the components within the video encoder 20 may be highly integrated with one another. For example, in some embodiments, the motion estimation module 42 may be highly integrated with the motion compensation module 44.

During the encoding process, the video encoder 20 receives a video frame or slice to be coded. The frame or slice may be divided into multiple video blocks, e.g., largest coding units (LCUs). The motion estimation module 42 and the motion compensation module 44 perform inter-prediction coding of the received video block relative to one or more blocks in one or more reference frames stored in the reference frame buffer 64 to provide temporal compression. The intra-prediction module 46 may perform intra-predictive coding of the received video block relative to one or more neighboring blocks in the same frame or slice as the block to be coded to provide spatial compression. The intra-prediction module 46 may be improved in accordance with the disclosed principles, as discussed later in this document.

The mode select module 40 may select one of the coding modes (e.g., intra- or inter-), based on rate distortion analysis for each mode. Based on this selection, the resulting intra- or inter-coded block may be provided to the summer 50 to generate residual data representing a residual block and to the summer 62 to reconstruct the encoded block for use in a reference frame. The mode select module 40 may also provide syntax elements, such as intra-prediction mode indicators, motion vectors, partition information, and other such syntax information, to the entropy encoding module 56. Some video frames may be designated as I-frames, where all blocks in an I-frame are encoded in an intra-prediction mode. In some cases, the intra-prediction module 46 may also perform intra-prediction encoding of a block in a P- or B-frame, for example, when a motion search performed by the motion estimation module 42 does not result in a satisfactory prediction of the block.

As mentioned above, the motion estimation module 42 and the motion compensation module 44 may be highly integrated, but are illustrated separately for conceptual purposes. Motion estimation is the process of generating motion vectors, which estimate motion for video blocks. A motion vector, for example, may indicate the displacement of a prediction unit (PU) in a current frame relative to a reference sample in a reference frame, where a PU may comprise a plurality of prediction blocks (e.g., one luma PB and two chroma PBs). A reference sample may be a block that is found to closely match the PU being coded in terms of a pixel difference metric. The pixel difference metric may involve a sum of absolute difference (SAD), sum of square difference (SSD), or other difference metrics.

The motion estimation module 42 calculates a motion vector for a PU of an inter-coded frame by comparing the PU to reference samples of a reference frame stored in the reference frame buffer 64. In some examples, the video encoder 20 may calculate values for sub-integer pixel positions of reference frames stored in the reference frame buffer 64. For example, the video encoder 20 may calculate values of one-quarter pixel positions, one-eighth pixel positions, or other fractional pixel positions of the reference frame. Therefore, the motion estimation module 42 may perform a motion search relative to both the full and fractional pixel positions and output a motion vector with fractional pixel precision. In some embodiments, the motion search may use luma PBs, which may be sufficiently representative of motion. The motion estimation module 42 may send the calculated motion vector to the entropy encoding module 56 and the motion compensation module 44.

Motion compensation, performed by the motion compensation module 44, may involve fetching or generating values for the PU based on the motion vector, which may be determined by the motion estimation module 42. Upon receiving the motion vector for the PU of the current video block, the motion compensation module 44 may locate a corresponding block to which the motion vector points in one of the reference frames. The summer 50 forms residual data representing a residual block by subtracting pixel values of the current video block being coded, forming pixel difference values, as discussed below. In general, the motion estimation module 42 performs motion estimation relative to luma components to calculate motion vectors, and the motion compensation module 44 uses the motion vectors for both chroma components and luma components.

The intra-prediction module 46 may intra-predictively encode the received block, as an alternative to inter-prediction performed by the motion estimation module 42 and the motion compensation module 44. The intra-prediction module 46 may encode the received block (e.g., transform block) relative to neighboring, previously coded blocks, e.g., blocks above, above and to the right, above and to the left, to the left, or below and to the left of the current block assuming a left-to-right, top-to-bottom encoding order for blocks. The intra-prediction module 46 may be configured with a variety of different intra-prediction modes. For example, the intra-prediction module 46 may be configured with a certain number of directional prediction modes, e.g., thirty-three directional prediction modes, based on the size of the coding unit being encoded. The intra-prediction module 46 may also be configured with other types of prediction modes, e.g., a planar prediction mode and a DC prediction mode.

The intra-prediction module 46 may select an intra-prediction mode by, for example, calculating error values for various intra-prediction modes and selecting a mode that yields the lowest error value or the highest score by another metric. Mode selections may be made at a PU level. Directional prediction modes may include functions for combining values of spatially neighboring pixels (also referred to as "neighbor pixels") and applying the combined values to one or more pixel positions in an associated PU. Once values for all pixel positions in a PU have been calculated, the intra-prediction module 46 may calculate an error value for the prediction mode based on pixel differences between the associated PU and the received block to be encoded. In some embodiments, the intra-prediction module may test every intra-prediction mode to determine which mode yields the lowest error value or the highest rating by another metric. In some embodiments, the intra-prediction module 46 may continue testing intra-prediction modes until an intra-prediction mode that yields an acceptable error value or a sufficient rating by another metric is determined Testing a subset of the available intra-prediction modes may decrease the processing latency and processing bandwidth required.

The intra-prediction module 46 may alternatively or additionally use rate-distortion analysis when testing various intra-prediction modes, and may select the intra-prediction mode having the best rate-distortion characteristics (among the tested modes) for each PU. Rate-distortion analysis generally determines an amount of distortion (e.g., error) between an encoded block and a corresponding original, unencoded block, as well as the number of bits (and the resulting bitrate) needed to produce the encoded block. The intra-prediction module 46 may calculate ratios from the distortions and the bitrates for the various encoded blocks to determine which intra-prediction mode exhibits the best rate-distortion value for the block. After selecting an intra-prediction mode, the intra-prediction module 46 may send the PU associated with the selected intra-prediction mode to the summer 50. An indicator of the selected intra-prediction mode may be sent to the entropy encoding module 56 to be included in the encoded video data output by the video encoder 20.

During the mode selection phase, the intra-prediction module 46 may intra-predict values of residual blocks using information stored in the reference frame buffer 64. The intra-prediction calculation may occur at a block level (e.g., one transform unit (TU) or transform block (TB) at a time), where some TUs may be smaller than the corresponding coding units (CU) and prediction units (PU) for which the intra-prediction mode is computed. Furthermore, the intra-prediction of one TU within a CU may depend on the intra-prediction and reconstruction of neighboring TUs that are also within the CU. In accordance with the disclosed principles, an intra-prediction engine may allow for improved pipelining of consecutive blocks (e.g., TUs) during intra-prediction. These principles are discussed later in this document.

The video encoder 20 determines residual data representing a residual block by subtracting the prediction data calculated by the motion compensation module 44 or the intra-prediction module 46 from the original video block being coded. The summer 50 represents the component or components that perform this subtraction operation. The residual block may correspond to a two-dimensional matrix of pixel difference values. The values in the residual block may correspond to the differences (e.g., error) between values of co-located pixels within an intra-predicted or inter-predicted block and within the original block to be coded. The differences may be chroma or luma differences depending on the type of block that is coded.

During intra-prediction, block-sized (e.g., TU-sized) portions of a partially intra-predicted CU or PU may propagate through the summer 50, the transform module 52, the quantization module 54, the inverse quantization module 58, the inverse transform module 60, the summer 62, and the reference frame buffer 64. Accordingly, intra-prediction of a second block (e.g., TU) may utilize reference values associated with a first block that has already been encoded, even if the first and second blocks are associated with a common CU or PU.

The transform module 52 may form TUs from the residual data, where each TU may comprise a plurality of transform blocks (e.g., one luma TB and two chroma TBs). The transform module 52 applies an image transform (e.g., two-dimensional transform), such as a discrete cosine transform (DCT), a discrete sine transform (DST), a discrete Fourier transform (DFT), a Hadamard transform, a wavelet transform, an integer transform, a sub-band transform, or another type of transform, to the TU, producing a video block comprising transform coefficients. The plurality of TBs associated with a TU may be computed simultaneously or consecutively.

The transform module 52 may send the resulting transform coefficients to the quantization module 54, which may then quantize the transform coefficients. Quantization generally refers to a process in which transform coefficients are converted to a reduced set of discrete values, which results in increased efficiency (e.g., higher compression) at the cost of precision. The level of quantization may be adaptively determined, such that higher energy coefficients are quantized less than lower energy coefficients. Further, some of the lower energy coefficients may be set to a value of "0" after being quantized by the quantization module 54. This may allow for improved compression from entropy encoding, as described below.

Following quantization, the video encoder 20 may scan the transform coefficients, producing a one-dimensional array from the two-dimensional matrix having the quantized transform coefficients. The scan may be designed to place lower frequency coefficients, which often have relatively higher energy, nearer to the front of the array and to place higher frequency coefficients nearer to the back of the array. In some examples, the video encoder 20 may use a predefined scan order (e.g., a zig-zag scan pattern) to scan the transform coefficients. In other examples, the video encoder 20 may perform an adaptive scan, and the selected scan order(s) may be encoded into the data stream. The scanning may be performed, e.g., by the entropy encoding module 56.

Once the transform coefficients are scanned, the entropy encoding module 56 may apply entropy coding such as context-adaptive variable-length coding (CAVLC), probability interval partitioning entropy (PIPE) coding, or context-based adaptive binary arithmetic coding (CABAC) to the coefficients. In addition, the entropy encoding module 56 may encode motion vector (MV) information and any of a variety of syntax elements useful in decoding the video data at a video decoder. These syntax elements may be used by a video decoder when reconstructing the encoded video data. Following the entropy coding by the entropy encoding module 56, the resulting encoded video may be transmitted to another device, such as a video decoder, or archived for later transmission or retrieval.

The inverse quantization module 58 and the inverse transform module 60 apply inverse quantization and inverse transformation, respectively, to reconstruct the residual block in the pixel domain, e.g., for creating a reference block for a reference frame that is stored in the reference frame buffer 64. The modules 58, 60 may be used to simulate portions of a video decoder, and accordingly may be substantially similar to corresponding modules present in a video decoder. The motion compensation module 44, in conjunction with the summer 62, may calculate a reference block by adding the residual block to a predictive block of one of the frames of the reference frame buffer 64. The motion compensation module 44 may also apply one or more interpolation filters to the reconstructed residual block to calculate sub-integer pixel values for use in motion estimation. The summer 62 may add the reconstructed residual block to the motion compensated prediction block produced by the motion compensation module 44 to produce a reconstructed video block for storage in the reference frame buffer 64. The reference frame buffer 64 may hold substantially the same video information that is received in a decoder, which may allow the video encoder 20 to accurately encode intra-prediction modes and motion vectors based on this common "state" information seen by the decoder during the time when the intra-prediction modes and motion vectors are applied.

The reconstructed video block stored in the reference frame buffer 64 may be used by the motion estimation module 42 and the motion compensation module 44 as a reference block to inter-code a block in another video frame. Additionally, or alternatively, the reconstructed video block may be used by the intra-prediction module 46 to intra-code a block in the same video frame. In some scenarios, a particular reference block may not be used for either intra-prediction or inter-prediction, but may merely be a part of a reference frame having other, useful reference blocks.

Figure 3:
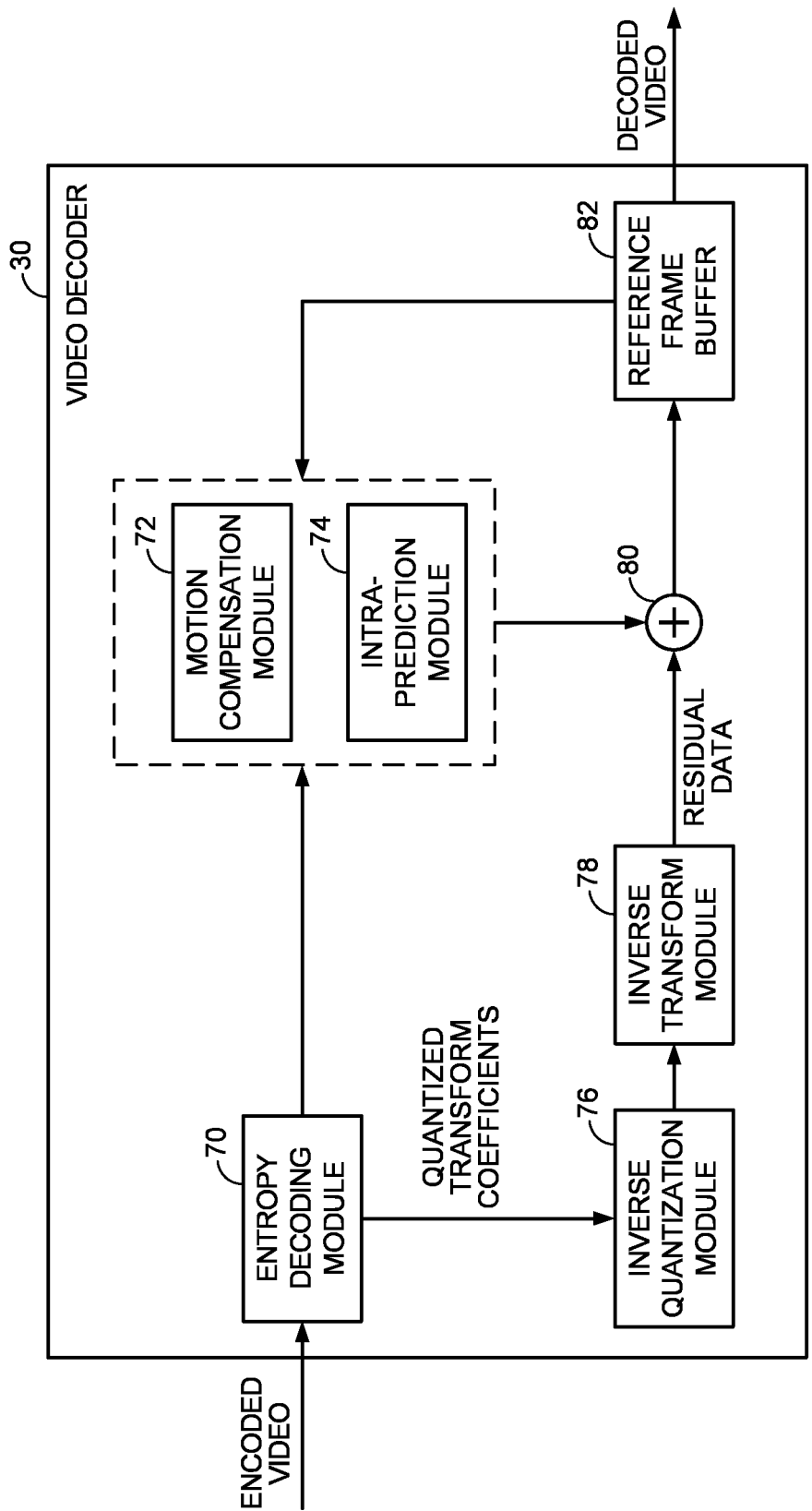
FIG. 3 shows a block diagram illustrating an example of a video decoder that may be implemented in accordance with the disclosed principles.

FIG. 3 shows a block diagram illustrating an example of a video decoder 30 that may be implemented in accordance with the disclosed principles. The video decoder 30 may be configured to perform any or all of the techniques of this disclosure.

In the example of FIG. 3, the video decoder 30 includes an entropy decoding module 70, a motion compensation module 72, an intra-prediction module 74, an inverse quantization module 76, an inverse transformation module 78, a reference frame buffer 82, and a summer 80. The video decoder 30 may, in some embodiments, perform a decoding pass generally reciprocal to the encoding pass described with respect to the video encoder 20 as described in FIG. 2.

Although shown as separate functional modules for ease of illustration, the structure and functionality of any of the components within the video decoder 30 may be highly integrated with one another. For example, in some embodiments, the entropy decoding module 70 may be highly integrated with the inverse quantization module 76.

During the decoding process, the video decoder 30 receives an encoded video bitstream that represents video blocks of an encoded video slice and associated syntax elements, as generated by a video encoder. The bitstream may be received from a variety of sources, including from a file server, from a storage medium, and from a video encoder via a modem, as shown in FIG. 1.

The entropy decoding module 70 may scan the received values using a scan mirroring the scan order used by the entropy encoding module of the video encoder that generated the bitstream (e.g., an inverse zig-zag scan pattern). Additionally, or alternatively, the scan order may be inferred by the video decoder 30 based on characteristics of the coded video such as prediction mode, block size, transform, or other characteristics. No matter how the scan order is determined, the entropy decoding module 70 may use the inverse of the scan order to scan the received one-dimensional array into a two-dimensional matrix. The entropy decoding module 70 may then entropy decode the encoded video, which may involve a process that is the inverse of that used by the entropy encoding module 56 of FIG. 2.

The video decoder 30 may receive the associated syntax elements at a video slice level and/or a video block level. The entropy decoding module 70 may further analyze the bitstream to extract quantized coefficients, motion vectors, intra-prediction mode indicators, and other syntax elements. The motion vectors may be received by the motion compensation module 72 and the intra-prediction mode indicators may be received by the intra-prediction module 74.

When the slice is coded as an intra-coded (I) slice, the intra-prediction module 74 may generate prediction data for a video block of the current video slice based on an intra-prediction mode indicator and data from previously decoded blocks of the current frame or picture. This process is covered in more detail in FIGS. 4-5 and the accompanying descriptions.

When the video frame is coded as an inter-coded (e.g., B, P, or GPB) slice, motion compensation module 72 may produce prediction units (PU) for a video block of the current video slice based on a motion vector and other syntax information. The PUs may be produced from one of the reference pictures within one of the reference picture lists. The video decoder 30 may construct the reference frame lists (e.g., List 0 and List 1, as defined by the HEVC standard), using default construction techniques based on reference pictures stored in the reference frame buffer 82. The motion compensation module 72 may determine prediction information for a video block by parsing the motion vectors and other syntax information. This prediction information may be used to produce the PUs for the current video block being decoded. For example, motion compensation module 72 may determine a prediction mode (e.g., intra- or inter-), an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

The motion compensation module 72 may also perform interpolation based on interpolation filters. The motion compensation module 72 may use interpolation filters similar to those used by the video encoder that encoded the video blocks to calculate interpolated values for sub-integer pixels of reference blocks. In some embodiments, the motion compensation module 72 may determine the interpolation filters used by the video encoder that generated the bitstream from the received syntax elements and use the interpolation filters to produce predictive blocks.

The inverse quantization module 76 inverse quantizes (e.g., de-quantizes) the quantized transform coefficients provided in the bitstream and decoded by entropy decoding module 70. The inverse quantization process may include use of a quantization parameter, $QP_y$, calculated by the video decoder 30 for each video block in the video slice to determine a degree of quantization and, likewise, a degree of inverse quantization that may be applied to determine the original transform coefficients, though some quantization error may be present.

The inverse transform module 78 may apply an inverse transform (e.g., an inverse DCT) to form residual data in a pixel or pixel difference domain. The inverse transform may be the inverse of that used by the transform module 52 of FIG. 2. The residual data may be computed in residual blocks having the same size as the transform units (TU), and thus transform blocks (TB), being decoded.

After the motion compensation module 72 and/or the intra-prediction module 74 generates a block-sized (e.g., TU-sized) portion of a coding unit (CU), the video decoder 30 forms a decoded video block by summing the residual block from the inverse transform module 78 with the corresponding block-sized predictive data generated by motion compensation module 72 and/or the intra-prediction module 74. The summer 80 represents the component or components that perform this summation operation and store the results in the reference frame buffer 82.

During intra-prediction, the summer 80 may iteratively sum each inverse transformed block with a corresponding block from the reference frame buffer 82, where the corresponding block may be the same size as the inverse transformed block and selected based, at least in part, on an intra-prediction mode indicator. Accordingly, the decoded blocks that are written to the reference frame buffer may correspond with and have the same size as TUs. By iteratively reconstructing and storing TU-sized decoded blocks into the reference frame buffer 82, a full, decoded CU may be determined at the reference frame buffer 82.

One objective of the present disclosure is to optimize scenarios where the TU and CU sizes differ, such that intra-prediction processing is further parallelized.

If desired, a deblocking filter may be applied to filter the decoded blocks in order to remove blockiness artifacts. Other loop filters (e.g., in the coding loop or after the coding loop) may also be used to smooth pixel transitions, or otherwise improve the video quality. The decoded video blocks in a given frame or picture are then stored in the reference frame buffer 82. The reference frame buffer 82 may store this and other reference frames or pictures that may be used for subsequent motion compensation and/or intra-prediction. The reference frame buffer 82 may also store decoded video for presentation on a display device.

Figure 4:
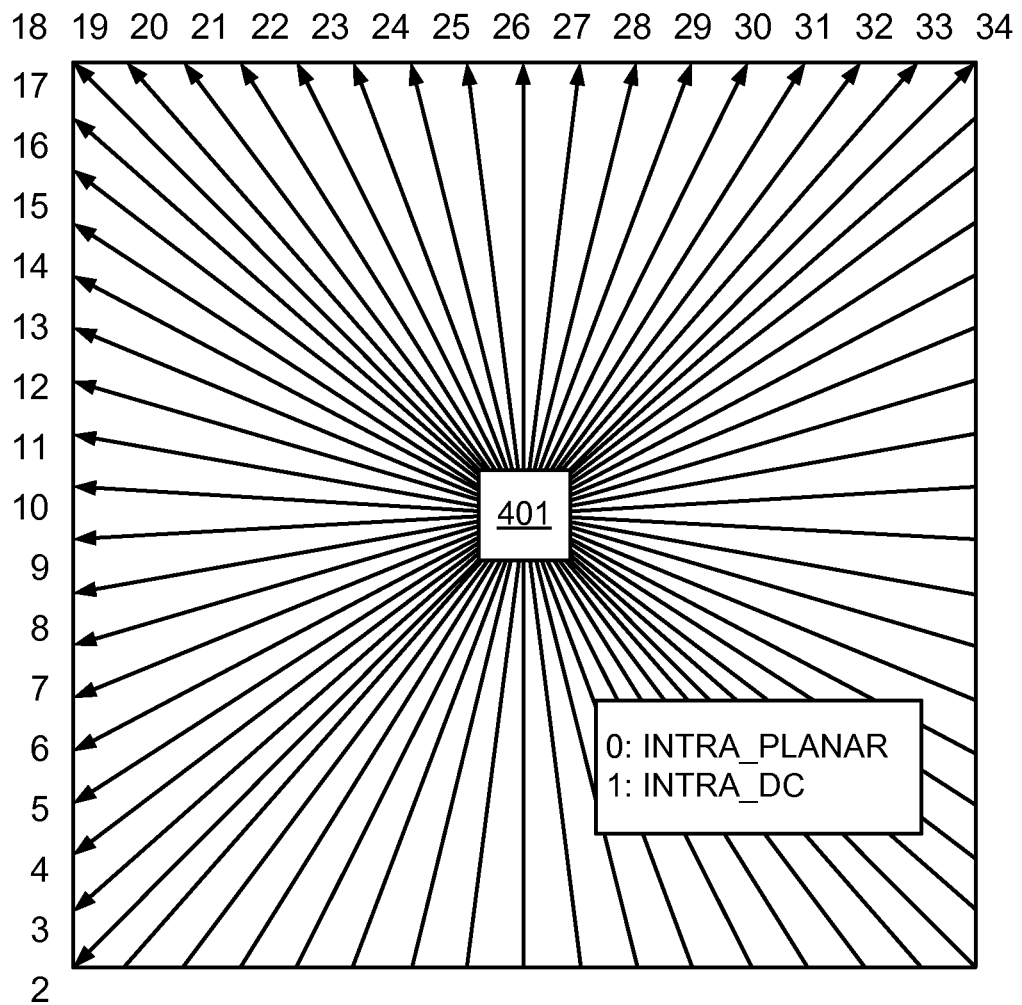
FIG. 4 shows a schematic diagram illustrating various modes for intra-prediction.

FIG. 4 shows a schematic diagram illustrating various modes for intra-prediction. Specifically, FIG. 4 illustrates thirty-five intra-prediction modes that may be used for HEVC coders. FIG. 4 is in the context of HEVC for purposes of illustration, but without limitation of this disclosure as to other coding standards or methods that may benefit from an improved intra-prediction process.

Images and video frames generally include spatially redundant data. Spatial redundancy implies that a given pixel may generally be correlated to at least one of the surrounding pixels. Intra-prediction allows for pixels within a block to be interpolated based on neighbor pixels. The selected neighbor pixels may be located in other blocks that have already been calculated, so as to remove dependencies within the block, thereby promoting parallel intra-prediction of multiple pixels within the block. For example, when using a directional mode, the neighbor pixels may be selected as the nearest pixels in a mode-defined direction that are outside of the block being calculated. This concept of using pixels from other blocks is further exemplified in FIG. 5 below.

As shown in FIG. 4, an intra-prediction value may be calculated for a pixel 401 based on an intra-prediction mode. The intra-prediction mode may be computed on a per prediction unit basis at a video encoder. When a prediction unit is the same size as a corresponding coding unit and its associated coding blocks, each transform block within the coding blocks may have a common intra-prediction mode. Intra-prediction mode indicators may encoded into a bitstream along with the other video data, so that the mode indicators may be used during a decoding process by a decoder. Some coding units (e.g., those that are inter-coded) may not have corresponding intra-prediction mode indicators.

Mode 0 may be used for a planar coding technique, where the pixel 401 is calculated according to a planar function defined by the HEVC standard. Mode 1 may be used for a DC coding technique; where the pixel 401 is calculated as the average of the neighbor pixels. Modes 2-34 may be used for directional coding techniques. Here, the arrows associated with Modes 2-34 indicate a search direction from which to find neighbor pixels for determining the value of the pixel 401. In situations where the arrow points between two neighbor pixels, an weighted interpolation function may be used to determine an intermediate value that may be a weighted average of the two neighbor pixels.

In HEVC, the intra-prediction scheme may be assumed to involve calculating blocks from left-to-right and then top-to-bottom (e.g., as one would read an English-language book), or from top-to-bottom and then left-to-right (e.g., as one would read some traditional East Asian scripts). As would be understood by one of ordinary skill in the art, it would be possible to rotate or otherwise alter the block calculation order (e.g., so that blocks are intra-predicted from right-to-left, then bottom-to-top). In those scenarios, the directional intra-prediction modes may be changed (e.g., rotated) to better promote usage of blocks that have already been calculated.

Depending on the selected mode, intra-prediction for pixels in a block may depend on the neighbor pixels in one or more other blocks. For example, when intra-prediction mode 26 is selected, intra-prediction of a block comprising pixel 401 may depend on a pixel in the bottom row from a neighboring block above the block. In another example, when intra-prediction mode 10 is selected, intra-prediction of a block comprising pixel 401 may depend on a pixel in the rightmost column of a neighboring block to the right of the block. As a result of these dependencies, intra-prediction may not be arbitrarily applied in parallel on neighboring blocks. As shown by the arrows, the other blocks providing neighbor pixels may be above, above and to the right, above and to the left, to the left, and below and to the left of the current block upon which intra-prediction is performed.

Figure 5:
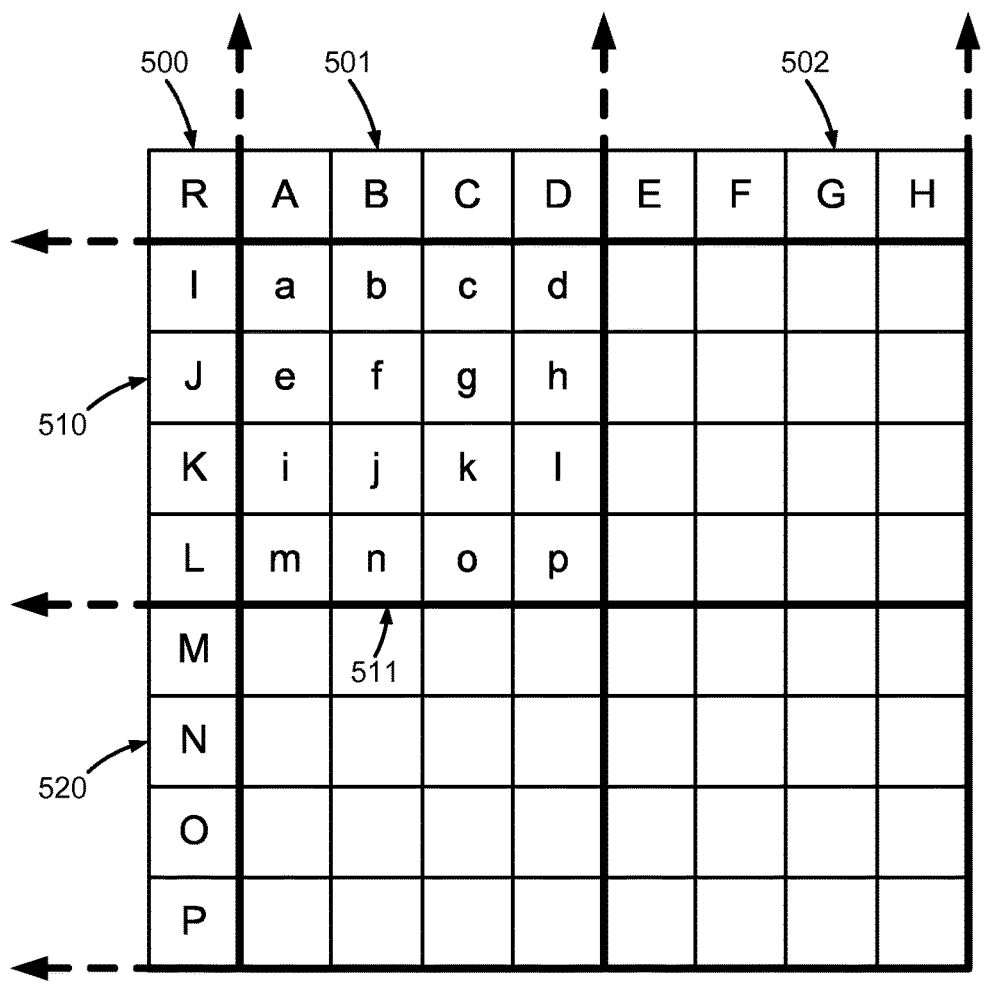
FIG. 5 shows schematic diagram illustrating the dependencies of a block on neighboring blocks.

FIG. 5 shows schematic diagram illustrating the dependencies of a block 511 on neighboring blocks. Each block may, for example, represent a transform unit that is within a common prediction unit to be intra-predicted. The blocks are separated by thick borders in the figure. Each block may have a size of 4×4 pixels. For example, the block 511 may comprise 16 pixels labeled "a" through "p."

Blocks 500, 501, 502, 510 and 520 are not completely shown. The block 501 comprises pixels "A," "B," "C," and "D" in its bottom row; the block 502 comprises pixels "E," "F," "G," and "H" in its bottom row; the block 510 comprises pixels "I," "J," "K," and "L" in its rightmost column; the block 520 comprises pixels "M," "N," "O," and "P" in its rightmost column; and the block 500 comprises pixel "R" in its bottom-right corner.

As described above, some video coding standards such as HEVC dictate that the intra-prediction of pixels within the block 511 depend on at least some of the reconstructed values of neighbor pixels within at least one of the neighboring blocks 500, 501, 502, 510 and 520. The nature of the dependency is characterized by an intra-prediction mode. For example, if a vertical intra-prediction mode (e.g., Mode 26 in HEVC) is selected, intra-prediction of the pixels "a" through "p" in the block 511 may rely upon the reconstructed values of the pixels "A" through "D" in the block 501. The reconstructed pixel data may become available after intra-prediction of the block 501 is complete, or, at minimum, after intra-prediction of the pixels "A" through "D" is complete. Accordingly, intra-prediction of the block 511 may be restricted to begin after intra-prediction of the block 501 is at least partially completed, for certain intra-prediction modes. In another example, if a horizontal intra-prediction mode (e.g., Mode 10 in HEVC) is selected, intra-prediction of the block 511 may rely upon the reconstructed values of the pixels "I" through "L" in the block 510. As another example, if a diagonal intra-prediction mode such as Mode 2 in HEVC is selected, intra-prediction of block 511 may involve calculations based on the pixels "I" through "P," which are located in the blocks 510 and 520. Some intra-prediction modes such as Mode 0 (DC mode) in HEVC may even utilize values from each of the blocks 500, 501, 502, 510 and 520 (if available).

In a pipelined architecture, all available intra-prediction modes may need to be supported, and so the at least partial reconstruction of the blocks 500, 501, 502, 510 and 520 may be beneficial before intra-prediction of 511 begins. As will be described below, a coding block may be selectively rotated or transposed based on an intra-prediction mode so as to remove the dependency upon one of the neighboring blocks (e.g., the block 520).

Figure 6:
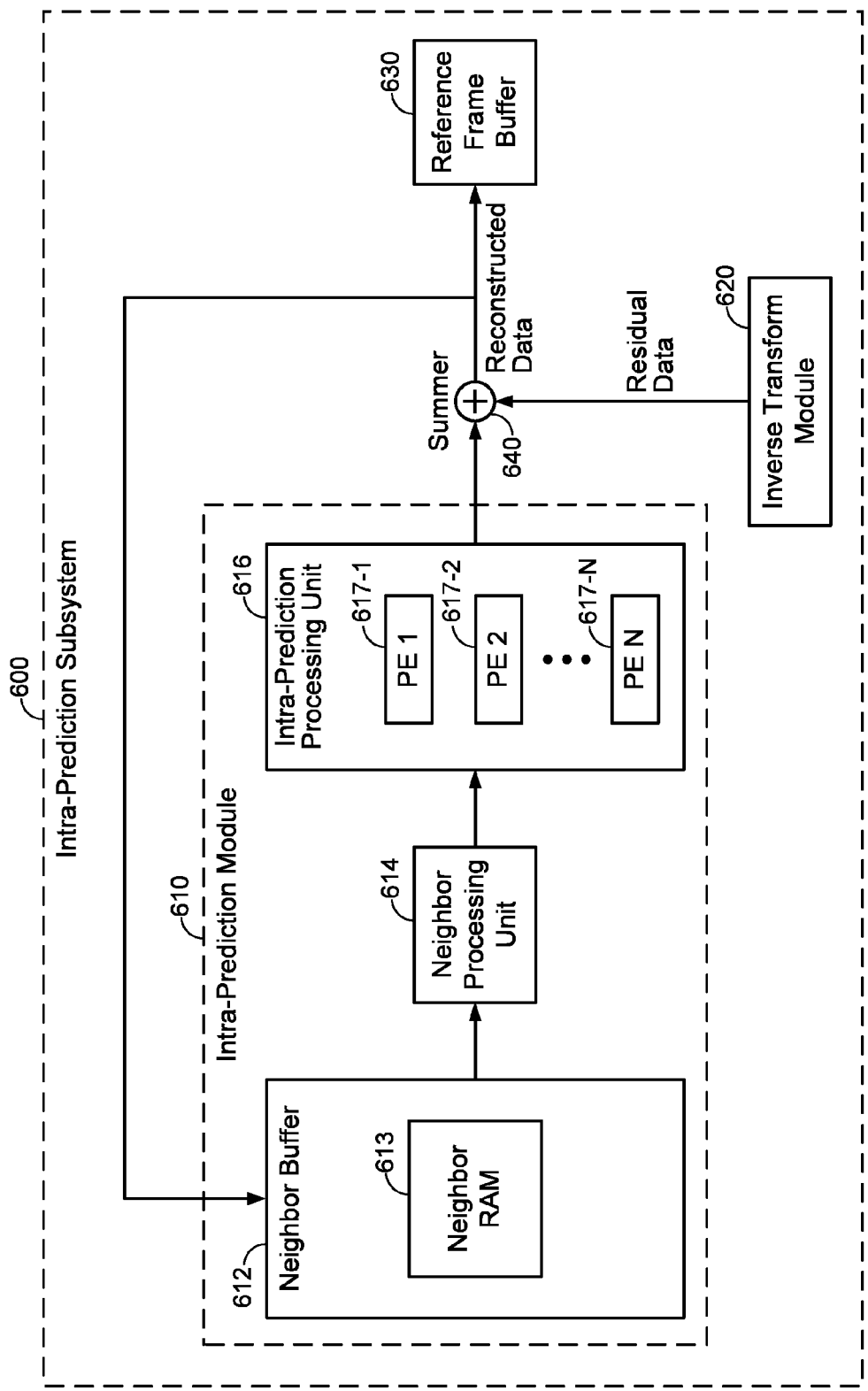
FIG. 6 shows a block diagram illustrating an intra-prediction subsystem.

FIG. 6 shows a block diagram illustrating an intra-prediction subsystem 600. The subsystem 600 includes an intra-prediction module 610, an inverse transform module 620, a reference frame buffer 630, and a summer 640. The subsystem 600 may be incorporated into video encoders and video decoders. For example, if the subsystem 600 is incorporated into the video encoder 20 of FIG. 2, the intra-prediction module 610 may represent the intra-prediction module 46 of FIG. 2, the inverse transform module 620 may represent the inverse transform module 60 of FIG. 2, the reference frame buffer 630 may represent the reference frame buffer 64 of FIG. 2, and the summer 640 may represent the summer 62 of FIG. 2.

Similarly, if the subsystem 600 is incorporated into the video decoder 30 of FIG. 3, the intra-prediction module 610 may represent the intra-prediction module 74 of FIG. 3, the inverse transform module 620 may represent the inverse transform module 78 of FIG. 3, the reference frame buffer 630 may represent the reference frame buffer 82 of FIG. 3, and the summer 640 may represent the summer 80 of FIG. 3. Certain components of the subsystem 600 (e.g., the reference frame buffer 630) may be additionally used in other subsystems.

The subsystem 600 may be designed to optimize the intra-prediction of consecutive blocks, even if intra-prediction of a given block may depend, at least in part, on the block immediately preceding it in the intra-prediction order. For example, intra-prediction of each block may depend on reconstructed pixels for either a critical row, a critical column, or neither in the preceding block, as will be shown in further detail in FIG. 7.

Returning to FIG. 6, the intra-prediction module 610 may comprise a neighbor buffer 612, a neighbor processing unit 614, and an intra-prediction processing unit 616. The neighbor buffer 612 may store and retrieve neighbor pixels using logic and/or circuitry to interface with a neighbor RAM 613. The neighbor pixels may comprise pixels that may be used when intra-predicting the blocks. In the context of HEVC, a block may represent a transform unit which may be associated with a coding unit (and a prediction unit) having an equal or larger size. The pixels may comprise chroma and/or luma values, depending on the type of block that is being intra-predicted. Here, the block size may be M×M, where M is a nonnegative integer value. Exemplary values for M include 4, 8, 16, and 32.

The pixels stored in the neighbor buffer 612 may need to be filtered, padded, and potentially conditioned in other ways before the pixels are received by the intra-prediction processing unit 616. These conditioning actions may be performed, at least in part, by a neighbor processing unit 614 that receives the pixels from the neighbor buffer 612 in preparation for processing by the intra-prediction processing unit 616. For example, the neighbor processing unit 614 may prepare 4M+1 neighbor pixels for the intra-prediction processing unit 616 to process a M×M block. These neighbor pixels may, for example, represent the neighbor pixels "A" through "R," as shown in FIG. 5.

Returning to FIG. 6, the intra-prediction processing unit 616 may comprise processing engines 617-1 to 617-N (also labeled as PE 1 to PE N), which may be implemented as hardware in a video encoding and/or video decoding device. The N processing engines 617 may each simultaneously operate on a common set of inputs received from the neighbor processing unit 614 to intra-predict different pixels within a block being processed. The processing engines 617 may each be capable of computing one pixel per cycle (e.g., clock cycle), and each processing engine 617 may calculate a different pixel or set of pixels within the block. Accordingly, the intra-prediction engine may be capable of computing N pixels per cycle, which may be received by the summer 640.

The summer 640 may add each set of N intra-predicted pixels that is output by the intra-prediction processing unit 616 to N corresponding residual values calculated by the inverse transform module 620, thereby reconstructing N pixels. The reconstructed pixels may be stored in the reference frame buffer 630. Some reconstructed pixels may be used for intra-predicting a subsequent block, and these reconstructed pixels may additionally be stored in the neighbor buffer 612. In some embodiments, the neighbor buffer 612 reads these reconstructed pixels from the reference frame buffer 630, and, in some embodiments, the summer 640 outputs these reconstructed pixels to both the reference frame buffer 630 and the neighbor buffer 612.

The number of processing engines, N, may scale with the memory bandwidth of the neighbor buffer 612. For example, in some embodiments, the read bandwidth of the neighbor buffer may be 2N pixels per cycle. However, other ratios of buffer read bandwidth to the number of processing engines may be used. Further, the shape of the neighbor RAM 613 may relate to the read bandwidth and/or the number of processing engines. For example, the neighbor RAM 613 may be configured to have a shape and size of 192/N×16N, where the RAM depth may be 192/N and the RAM width may be 16N. While the neighbor buffer 612 is shown to include RAM 613, other suitable types of memory may additionally or alternatively be used.

When intra-predicting pixels in a block, the intra-prediction processing unit 616 may prioritize pixels that will be used for intra-prediction of subsequent blocks (e.g., the block immediately following the current block). After these pixels are intra-predicted, they may be summed with corresponding residual values at the summer 640 to generate reconstructed pixels that may be stored back in the neighbor buffer 612 (as well as in the reference frame buffer 630). The reconstructed pixels may then be filtered, padded, and potentially conditioned in other ways for the intra-prediction processing unit 616 by the neighbor processing unit 614. With a suitable prioritization of pixels, the neighbor processing unit 614 may have the reconstructed residual values for the next block ready before the intra-prediction processing unit 616 finishes intra-predicting the current block. Accordingly, the intra-prediction processing unit 616 may begin processing the next block immediately after the current block is finished, even when the next block has dependencies on the current block, and/or when the current block and the next block are within a common coding unit. This is a significant improvement over traditional methodologies.

Figure 7:
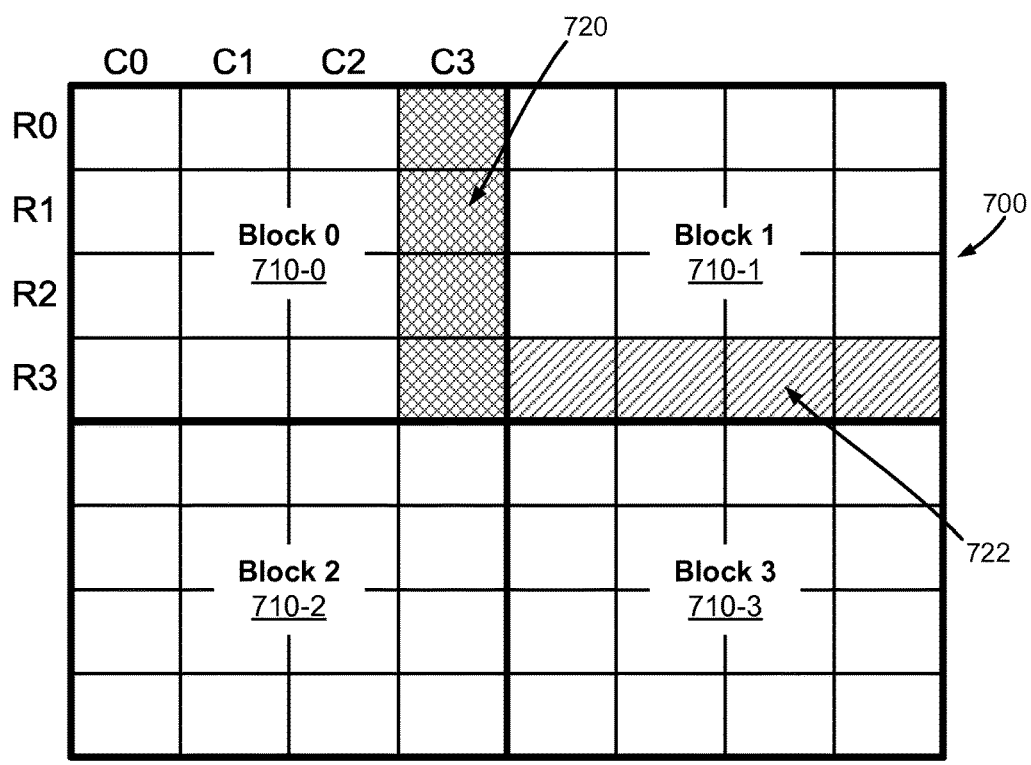
FIG. 7 shows a block diagram illustrating a coding block that is selected for intra-prediction.

FIG. 7 shows a block diagram illustrating a coding block 700 that is selected for intra-prediction. The coding block 700, may have a plurality of transform blocks 710-0, 710-1, 710-2, and 710-3, which may generally be processed in that order. In non-HEVC contexts, the coding block 700 may refer to a macroblock 700 and the transform blocks 710-0, 710-1, 710-2, and 710-3 may more generally refer to blocks 710-0, 710-1, 710-2, and 710-3. During intra-prediction, the coding block 700 may have a single intra-prediction mode that is shared by each of the corresponding transform blocks 710. The blocks 710 may be the unit by which a reference frame buffer is updated during reconstruction.

In some scenarios, a transform block may be the same size as a corresponding coding block, while in other scenarios (e.g., as shown in FIG. 7), the transform blocks may be smaller than the associated coding block (which itself may be associated with a single prediction block). Accordingly, a group of neighboring transform blocks may have the same intra-prediction mode. As a result, the transform blocks within a coding block may have a regular pattern of dependency with previous transform blocks during intra-prediction.

As an example of block dependency, if a horizontal intra-prediction mode or certain diagonal intra-prediction modes are selected, intra-prediction of the block 710-1 (also labeled as Block 1) may be dependent on reconstruction of a critical column 720 (e.g., a rightmost column) of the block 710-0 (also labeled as Block 0). Similarly, if certain diagonal intra-prediction modes are selected, intra-prediction of the block 710-2 (also labeled as Block 2) may depend on reconstruction of a critical row 722 (e.g., a bottom row) of the block 710-1.

The critical column 720 may be the only part of the block 710-0 that the block 710-1 is dependent on during intra-prediction. The other neighbor pixels (e.g., those above the block 710-1) may already be reconstructed and stored in the neighbor buffer as a result of the completed reconstruction of a coding block above the coding block 700. Accordingly, the critical column 720 may be prioritized during the intra-prediction of the block 710-0. When reconstructed pixels for the critical column 720 are determined, preparation for the intra-prediction of block 710-1, (e.g., filtering and padding) may begin. This preparation may occur and be completed while the intra-prediction of the block 710-0 is still in progress, as will be shown below in FIG. 8. Accordingly, the block 710-1 may be intra-predicted immediately after the intra-prediction processing unit finishes processing the block 710-0.

Similarly, the critical row 722 may be the only part of the block 710-1 that the block 710-2 is dependent on during intra-prediction. The other neighbor pixels (e.g., those to the left of the block 710-2) may already be reconstructed and stored in the neighbor buffer as a result of the completed reconstruction of a coding block to the left of the coding block 700. Accordingly, the critical row 722 may be prioritized during the intra-prediction of the block 710-1, and the block 710-2 may be intra-predicted immediately after the intra-prediction processing unit finishes processing the block 710-1.

When a critical row or column is prioritized, the N processing engines (as shown in FIG. 6) may each select a different pixel or set of pixels to process. As a single row or column in an M×M block may have M pixels, M/N cycles may be required to intra-predict a single critical row or column. This may be substantially less than the M*M/N cycles that may be required to process an entire block, which may provide sufficient time for the neighbor processing unit to prepare the neighbor pixels for the next block.

For example, if there are two processing engines working on the block 710-0, which is shown to be a 4×4 block, the first processing engine may calculate an intra-predicted value for the pixel at the intersection of column C3 and row R0 during a first cycle. During this same cycle, the second processing engine may calculate an intra-predicted value for the pixel at the intersection of column C3 and row R1. In the following cycle, the first and second processing engines may interpolate values for the pixel at the intersection of column C3 and row R2 and for the pixel at the intersection of column C3 and row R3, respectively. Accordingly, in two cycles, the intra-prediction of the critical column 720 may be completed. The critical column 720 may then be reconstructed, stored, and prepared for intra-prediction of the next block (e.g., the block 710-1) during a time when the processing engines are interpolating the remaining columns. In other words, the neighbor processing performed by a neighbor processing unit is pipelined with the intra-prediction performed by an intra-prediction processing unit.

In general, the intra-prediction processing unit may selectively and flexibly select pixels for prediction. For example, as evidenced above, the intra-prediction processing unit may operate on columns or rows, depending, at least in part, on the relative position of the next block (e.g., transform block) to be intra-predicted. If the next block to be intra-predicted is to the right of the current block, a rightmost column of the current block may be prioritized. After the rightmost column is processed, the remainder of the block may be processed in a column-wise pattern. Similarly, if the next block to be intra-predicted is below or below and to the left of the current block, a bottom row of the current block may be prioritized. The remainder of the current block may be processed in a row-wise pattern.

The prioritization of critical columns and rows may be adjusted for different intra-prediction orders of blocks. Furthermore, in some embodiments, a plurality of columns or rows may be prioritized instead of a single column or row. For example, this may occur when intra-prediction of a block uses both the nearest and the second nearest row or column.

It may be noted that the block 710-1 is not shown to have any dependency on the block 710-2, even though it was shown in FIGS. 4-5 that intra-prediction may utilize pixels from blocks that are below and to the left of the block being intra-predicted. However, to prevent this dependency from unnecessarily halting or delaying intra-prediction of the block 710-1, the coding block 700 may be rotated or transposed when this type of dependency occurs. This effectively shifts the intra-prediction vector towards completed (or at least partially completed) blocks, thereby promoting optimized processing of consecutive transform blocks within a coding block.

While FIG. 7 shows a coding block having four transform blocks, the number of transform blocks within a coding block may vary. For example, a coding block may be associated with 1, 4, 16, 64, or 256 transform blocks. Furthermore, while a transform block is shown to have a size of 4×4, other block sizes may be selected. For example, in HEVC, a transform block may have a size of 4×4, 8×8, 16×16, or 32×32.

Figure 8:
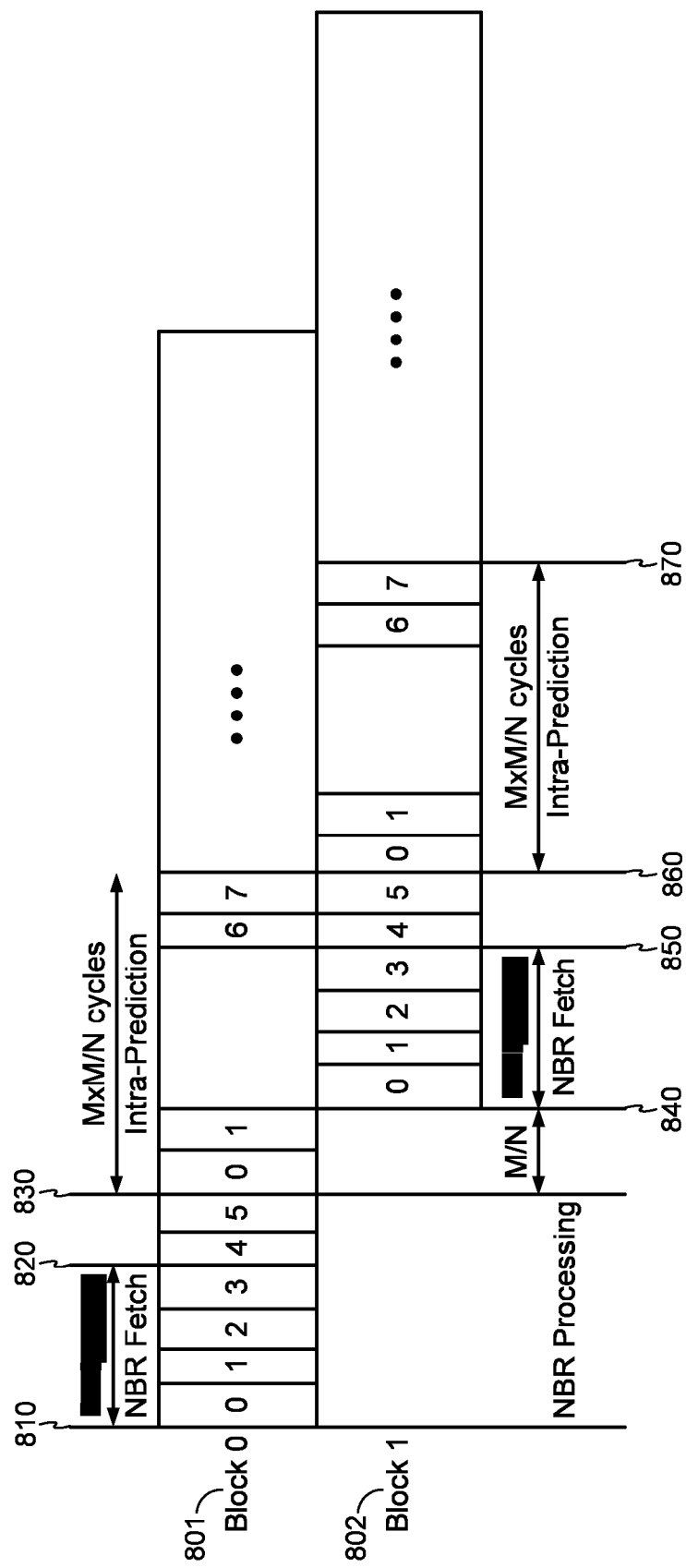
FIG. 8 shows a timing diagram illustrating an interleaved intra-prediction technique.

FIG. 8 shows a timing diagram illustrating an interleaved intra-prediction technique. Specifically, the timing diagram shows a first timeline 801 for intra-prediction of a first block (Block 0), and a second timeline 802 for intra-prediction of a second block (Block 1). In the context of HEVC, these blocks may represent transform blocks. The timing diagram is associated with an embodiment of the intra-prediction subsystem shown in FIG. 6, and the block size is assumed to be M×M. All timings are exemplary in nature and they may vary depending on processing delays and other factors.

At a time 810, a neighbor processing unit may fetch or otherwise receive the neighbor pixels that may be used for intra-prediction of the first block. As described above, 4M+1 neighbor pixels may be received, for example, from a neighbor buffer. Here, the "1" represents a corner (e.g., top-left corner) pixel which may be stored in a separate register (and may be discounted for the timing calculation). However, the corner pixel may additionally or alternatively be stored in the neighbor buffer. If the read bandwidth from the buffer is 2N pixels per cycle, then it may take approximately 2M/N cycles for the neighbor processing unit to read all of the neighbor pixels. This action may be completed at a time 820.

After the neighbor pixels are fetched, they may be padded, filtered, and/or conditioned in other ways in preparation for the intra-prediction processing unit. This may take a fixed amount of cycles (e.g., two cycles) and may be completed at a time 830.

At the time 830, the intra-prediction processing unit may begin intra-predicting the first block, starting with a critical row or column. The critical row or column in an M×M block may have M pixels, and the intra-prediction processing unit may be capable of processing N pixels per cycle. Accordingly, after approximately M/N cycles, the critical row or column may be intra-predicted. The intra-predicted values may be summed with the corresponding residual values to create reconstructed pixels that are stored in the neighbor buffer, so that they are ready to be received by the neighbor processing unit at a time 840.

At the time 840, the neighbor processing unit may fetch or otherwise receive the reconstructed neighbor pixels that may be used for intra-prediction of the second block. As mentioned above, some of the received pixels may correspond with the critical row or column of the first block, thereby causing a delay between the time 830 when the neighbor processing unit has prepared and sent the neighbor pixels for the first block to the intra-prediction processing unit and the time 840 when the neighbor processing unit begins receiving neighbor pixels for the second block.

Over approximately 2M/N cycles, the neighbor processing unit may receive each of the neighbor pixels for intra-predicting the second block, which may be completed at a time 850. After a fixed amount of cycles (e.g., two cycles) for padding, filtering, and/or otherwise conditioning the neighbor pixels, the neighbor processing unit may finish preparing the pixels for the intra-prediction processing unit.

At a time 860, the intra-prediction processing unit may complete processing the first block and may begin processing the second block. In other words, the second block may be processed immediately after the first block, because the neighbor processing unit may be ready with the neighbor pixels for the second block at the time 860. In some embodiments, the neighbor processing unit may complete preparation (e.g. padding and filtering) of the neighbor pixels for the second block prior to the time 860.

From the perspective of the intra-prediction processing unit, the first block is received from the neighbor processing unit at the time 830 and processed in approximately M*M/N cycles ending at the time 860. As soon as the first block is completely processed, the intra-prediction processing unit may begin processing the second block, using the corresponding 4M+1 neighbor pixels prepared by the neighbor processing unit. After another time period of approximately M*M/N cycles, the intra-prediction processing unit completes processing the second block (at a time 870) and may immediately begin processing a third block using the corresponding 4M+1 neighbor pixels that may already be prepared by the neighbor processing unit.

It may be noted that the neighbor processing unit may process (e.g., read from a buffer, pad, and filter) neighbor pixels for the second block during a time when the intra-prediction processing unit is still processing (e.g. intra-predicting) the first block. In this way, the neighbor processing unit may be pipelined (and interleaved) with the intra-prediction processing unit, which can increase efficiency and throughput of the intra-prediction module and subsystem.

Often, in pipelined architectures, data should remain in buffers for minimal periods of time, because stationary data may lead to (or be indicative of) inefficiencies and lower throughput. It may be noted that the processing cycle for each block is approximately M*M/N cycles, and accordingly, this may also be the average time that each set of 4M (or 4M+1) neighbor pixels may be stored in the neighbor buffer. This shortened period of storage (compared to conventional designs) is indicative of the increased throughput and efficiency that is achievable for intra-prediction modules and subsystems designed in accordance with the disclosed principles.

Again, the exact number of cycles for any of the actions or periods shown in FIG. 8 are merely exemplary, and they may vary depending on delays due to processing and other factors.

The number of processing engines (N) and the neighbor buffer read bandwidth (e.g., 2N pixels per cycle) may both scale according to different performance requirements. Table 1 below shows various configurations in accordance with the disclosed principles.

TABLE 1

|  | Configuration 1 | Configuration 2 | Configuration 3 | Configuration 4 |
| --- | --- | --- | --- | --- |
| Cycle Count Budget for 32 × 32 Coding Unit | 400 | 800 | 1600 | 3200 |
| Neighbor Buffer Size | 2 × 24 × 64 | 48 × 64 | 96 × 32 | 192 × 16 |
| Number of PEs in intra-prediction processing unit | 8 | 4 | 2 | 1 |
| Neighbor Buffer Read Bandwidth | 16 | 8 | 4 | 2 |
| Area (um$^2$) | 50000 | 36000 | 26550 | 20500 |

The values shown in Table 1 were measured or otherwise determined with respect to hardware designs running at 400 MHz using a 28 nm technology node. The technology node and operating frequency are purely exemplary and other technology nodes and/or operating frequencies may be used.

The table shows that the number of processing engines (PEs) as well as the neighbor buffer read bandwidth (and, e.g., neighbor RAM width) may increase to accommodate higher performance requirements, where the performance requirements are given as a cycle count budget. For example, Configuration 1 may be selected on high-end coding devices designed to encode and/or decode video, e.g., having Ultra High Definition (UHD) resolution (3,840 by 2,160 pixels or greater). Configurations 2 and 3 may be oriented towards mid-level devices (e.g., 1080p), and Configuration 4 may be oriented towards low-end devices (e.g., 720p).

While various embodiments in accordance with the disclosed principles have been described above, it should be understood that they have been presented by way of example only, and are not limiting. Thus, the breadth and scope of the disclosure should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Various terms used in the present disclosure have special meanings within the present technical field. Whether a particular term should be construed as such a "term of art" depends on the context in which that term is used. "Connected to," "in communication with," "associated with," or other similar terms should generally be construed broadly to include situations both where communications and connections are direct between referenced elements or through one or more intermediaries between the referenced elements. These and other terms are to be construed in light of the context in which they are used in the present disclosure and as one of ordinary skill in the art would understand those terms in the disclosed context. The above definitions are not exclusive of other meanings that might be imparted to those terms based on the disclosed context.

Words of comparison, measurement, and timing such as "at the time," "immediately," "equivalent," "during," "complete," "identical," and the like should be understood to mean "substantially at the time," "substantially immediately," "substantially equivalent," "substantially during," "substantially complete," "substantially identical," etc., where "substantially" means that such comparisons, measurements, and timings are practicable to accomplish the implicitly or expressly stated desired result.

Where the term "block" is used, this may refer to any of a largest coding unit (LCU), a coding tree block (CTB), a coding unit (CU), a coding block (CB), a prediction unit (PU), a prediction block (PB), a transform unit (TU), a transform block (TB), a sub-block as defined by H.264/AVC, and/or similar data structures depending on the context in which it is used.

While various subject matter is described with respect to HEVC, this subject matter may also be applicable to other standards, including those currently existing, under development, and yet to be developed. For example, where the terms "CU" and "CB" are used, they may also refer to a macroblock as defined by the H.264/AVC standard and/or similar data structures of other encoding standards, depending on the context in which they are used. Similarly, where the terms "TU" and "TB" are used, they may also refer to a sub-block as defined by the H.264/AVC standard and/or similar data structures of other encoding standards, depending on the context in which they are used.

Further, where the term "pixel" is used, this may refer to a luma value, chroma value, or a combination of chroma and luma values within a video frame or image.

The disclosed principles are generally compatible with numerous other techniques for achieving parallelism, included wavefront parallel processing (WPP), video slices, and video tiles.

Additionally, the section headings herein are provided for consistency with the suggestions under 37 C.F.R. 1.77 or otherwise to provide organizational cues. These headings shall not limit or characterize the subject matter set forth in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any subject matter in this disclosure. Neither is the "Summary" to be considered as a characterization of the subject matter set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A method of performing intra-prediction for a first block and a second block, the method comprising:
   receiving, at a first processing unit, a first plurality of pixels separate from the first block;
   processing, by the first processing unit, the first plurality of pixels by at least one of padding, filtering, and conditioning the first plurality of pixels for intra-prediction by a second processing unit during a first time period;
   receiving, by the second processing unit, the processed first plurality of pixels;
   encoding, by the second processing unit, the first block comprising a first plurality of intra-predicted pixels based on at least the processed first plurality of pixels during a second time period immediately following the first time period;
   receiving, by the first processing unit, a second plurality of pixels separate from the second block;
   processing, by the first processing unit, the second plurality of pixels by at least one of padding, filtering, and conditioning the second plurality of pixels for intra-prediction during the second time period; and
   encoding, by the second processing unit, the second block comprising a second plurality of intra-predicted pixels based on at least the processed second plurality of pixels during a third time period immediately following the second time period,
   wherein at least some pixels of the first plurality of intra-predicted pixels in the first block are included in the second plurality of pixels used for coding the second block.

2. The method of claim 1, wherein the first and second blocks are transform blocks that are both associated with a common intra-prediction mode.

3. The method of claim 1, wherein the second processing unit comprises a number, N, of processing engines, and wherein each processing engine intra-predicts a different pixel during each cycle of the second and third time periods.

4. The method of claim 3, wherein the first block has a size of M pixels by M pixels, and wherein the second time period lasts approximately M*M/N cycles.

5. The method of claim 3, wherein the first processing unit receives the first and second pluralities of pixels from a buffer having a read bandwidth of 2N pixels per cycle.

6. The method of claim 4, wherein the first plurality of pixels comprises 4M+1 pixels.

7. The method of claim 1, wherein the determining of the first block comprises determining at least a first row or column of intra-predicted pixels before determining a remainder of the first block, wherein at least the first row or column of intra-predicted pixels is included in the second plurality of pixels used to determine the second block.

8. A processor system for performing intra-prediction for a first block and a second block, the processor system comprising:
   a memory unit configured to store a plurality of blocks;
   a first hardware processor operable to:
      receive a first plurality of pixels separate from the first block, and
      process the first plurality of pixels by at least one of padding, filtering, and conditioning the first plurality of pixels for intra-prediction during a first time period; and a second hardware processor operable to:
      receive the processed first plurality of pixels, and
      encode the first block comprising a first plurality of intra-predicted pixels based on at least the processed first plurality of pixels during a second time period immediately following the first time period;
   wherein the first hardware processor is further operable to:
      receive the second plurality of pixels separate from the second block, and
      process the second plurality of pixels by at least one of padding, filtering, and conditioning the second plurality of pixels for intra-prediction during the second time period,
   wherein the second hardware processor is further operable to:
      receive the processed second plurality of pixels, and
      encode a second block comprising a second plurality of intra-predicted pixels based on at least the processed second plurality of pixels during a third time period immediately following the second time period, and
   wherein at least some pixels of the first plurality of intra-predicted pixels in the first block correspond with at least some of the second plurality of pixels used for encoding the second block.

9. The processor system of claim 8, wherein the first and second blocks are transform blocks that are both associated with a common intra-prediction mode.

10. The processor system of claim 8, wherein the second hardware processor comprises a number, N, of processing engines, and wherein each processing engine is operable to intra-predict a different pixel during each cycle of the second and third time periods.

11. The processor system of claim 10, wherein the first block has a size of M pixels by M pixels, and wherein the second time period lasts approximately M*M/N cycles.

12. The processor system of claim 10, further comprising a buffer operable to store the first and second pluralities of pixels, wherein the buffer has a read bandwidth of 2N pixels per cycle.

13. The processor system of claim 11, wherein the first plurality of pixels comprises 4M+1 pixels.

14. The processor system of claim 8, wherein e second hardware processor is further operable to determine a first row or column of intra-predicted pixels in the first block before determining a remainder of the first block, wherein the first row or column of intra-predicted pixels is included in the second plurality of pixels used to encode the second block.

15. A video decoder, comprising:
a memory unit configured to store a plurality of blocks;
a processor system operable to perform intra-prediction for a first block and a second block, the processor system comprising:
 a first hardware processor operable to:
  receive a first plurality of pixels separate from the first block, and
  process the first plurality of pixels by at least one of padding, filtering, and conditioning the first plurality of pixels for intra-prediction by a second processing unit during a first time period; and
 a second hardware processor operable to:
  receive the processed first plurality of pixels, and
  encode the first block having a first plurality of intra-predicted pixels based on the processed first plurality of pixels during a second time period immediately following the first time period,
 wherein the first hardware processor is further operable to:
  receive a second plurality of pixels separate from the second block, and
  process the second plurality of pixels by at least one of padding, filtering, and conditioning the second plurality of pixels for intra-prediction by the second hardware processor during the second time period, and
 wherein the second hardware processor is further operable to:
  receive the processed second plurality of pixels, and
 encode the second block having a second plurality of intra-predicted pixels based on the processed second plurality of pixels during a third time period immediately following the second time period; an inverse transform module operable to provide a first residual block and a second residual block; and
a summer operable to add the first block with the first residual block to determine a first reconstructed block, the summer further operable to add the second block with the second residual block to determine a second reconstructed block,
 wherein the first reconstructed block comprises at least some of the second plurality of pixels used for determining the second block.

16. The video decoder of claim 15, further comprising:
a reference frame buffer operable to store the first and second reconstructed blocks as portions of a reference frame,
wherein the reference frame may be used for at least one of subsequent motion compensation, intra-prediction, and display on a presentation device.

17. The video decoder of claim 15, wherein the second hardware processor comprises a number, N, of processing engines, and wherein each processing engine is operable to intra-predict a different pixel during each cycle of the second and third time periods.

18. The video decoder of claim 17, wherein the first block has a size of M pixels by M pixels, and wherein the second time period lasts approximately M*M/N cycles.

19. The video decoder of claim 17, further comprising a buffer operable to store the first and second pluralities of pixels, wherein the buffer has a read bandwidth of 2N pixels per cycle.

20. The video decoder of claim 19, wherein the buffer comprises neighbor RAM having a RAM width of 16N.

21. The video decoder of claim 18, wherein the plurality of pixels comprises 4M+1 pixels.

22. The video decoder of claim 15, wherein the second hardware processor is further operable to determine a first row or column of intra-predicted pixels in the first block before determining a remainder of the first block, wherein the first row or column of intra-predicted pixels is included in the second plurality of pixels used to determine the second block.

23. The video decoder of claim 22, wherein the inverse transform module is further operable to generate residual values corresponding to the first row or column.

24. The video decoder of claim 23, wherein the summer is further operable to add the first row or column with the corresponding residual values to generate at least some of the second plurality of pixels.

25. The method of claim 7, wherein the processing of the second plurality of pixels begins approximately 2M/N cycles after the determining of the first row or column of the first block is finished.

26. The processor system of claim 14, wherein the first hardware processor is operable to begin processing the second plurality of pixels approximately 2M/N cycles after the second hardware processor finishes encoding the first row or column of the first block.

* * * * *